(12) United States Patent
Sasaki

(10) Patent No.: US 10,827,129 B2
(45) Date of Patent: Nov. 3, 2020

(54) IMAGE PROCESSING APPARATUS AND IMAGING APPARATUS

(71) Applicant: SONY CORPORATION, Tokyo (JP)

(72) Inventor: Toshiyuki Sasaki, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/485,553

(22) PCT Filed: Dec. 27, 2017

(86) PCT No.: PCT/JP2017/046969
§ 371 (c)(1),
(2) Date: Aug. 13, 2019

(87) PCT Pub. No.: WO2018/154965
PCT Pub. Date: Aug. 30, 2018

(65) Prior Publication Data
US 2019/0373155 A1 Dec. 5, 2019

(30) Foreign Application Priority Data

Feb. 24, 2017 (JP) ................................ 2017-033535

(51) Int. Cl.
*H04N 5/235* (2006.01)
*G03B 15/05* (2006.01)
(Continued)

(52) U.S. Cl.
CPC ............ *H04N 5/235* (2013.01); *G03B 15/05* (2013.01); *H04N 5/332* (2013.01)

(58) Field of Classification Search
CPC ...... H04N 5/235; H04N 5/332; H04N 5/2351; H04N 5/2354; H04N 9/04551; H04N 9/04553; G03B 15/05
See application file for complete search history.

(56) References Cited

U.S. PATENT DOCUMENTS

| 7,423,674 B2* | 9/2008 | Takeshita | ............... H04N 9/735 348/223.1 |
| 2006/0008171 A1* | 1/2006 | Petschnigg | ............... G06T 5/50 382/254 |

(Continued)

FOREIGN PATENT DOCUMENTS

| JP | 2014-135627 A | 7/2014 |
| JP | 2016-096430 A | 5/2016 |

(Continued)

OTHER PUBLICATIONS

International Search Report and Written Opinion of PCT Application No. PCT/JP2018/046969, dated Feb. 27, 2018, 10 pages of ISRWO.

*Primary Examiner* — Shahbaz Nazrul
(74) *Attorney, Agent, or Firm* — Chip Law Group

(57) ABSTRACT

The present disclosure minimizes the degradation of image quality when an active image and a passive image are combined. The present disclosure provides an image processing apparatus that includes a correlation amount calculation section and a combination section. The correlation amount calculation section calculates the amount of correlation between the luminance of an active image captured by irradiating light and the luminance of a passive image captured without irradiating light. The combination section combines the luminance of the active image with the luminance of the passive image in accordance with the calculated amount of correlation. The above configuration minimizes the degradation of image quality when the active image and the passive image are combined.

12 Claims, 7 Drawing Sheets

(51) Int. Cl.
*H04N 5/232* (2006.01)
*H04N 5/33* (2006.01)

(56) References Cited

U.S. PATENT DOCUMENTS

| | | | |
|---|---|---|---|
| 2013/0250123 A1* | 9/2013 | Zhang | H04N 5/332 |
| | | | 348/164 |
| 2014/0192202 A1* | 7/2014 | Sano | H04N 5/332 |
| | | | 348/164 |
| 2014/0307058 A1* | 10/2014 | Kirk | G06F 9/3004 |
| | | | 348/47 |
| 2017/0237887 A1 | 8/2017 | Tanaka et al. | |
| 2017/0372444 A1* | 12/2017 | Hosokawa | H04N 5/225 |
| 2018/0069996 A1* | 3/2018 | Shukla | H04N 9/07 |
| 2020/0112662 A1* | 4/2020 | Sakamoto | H04N 9/07 |

FOREIGN PATENT DOCUMENTS

| | | |
|---|---|---|
| JP | 2017-005484 A | 1/2017 |
| JP | 2017-011633 A | 1/2017 |

\* cited by examiner

FIG.7
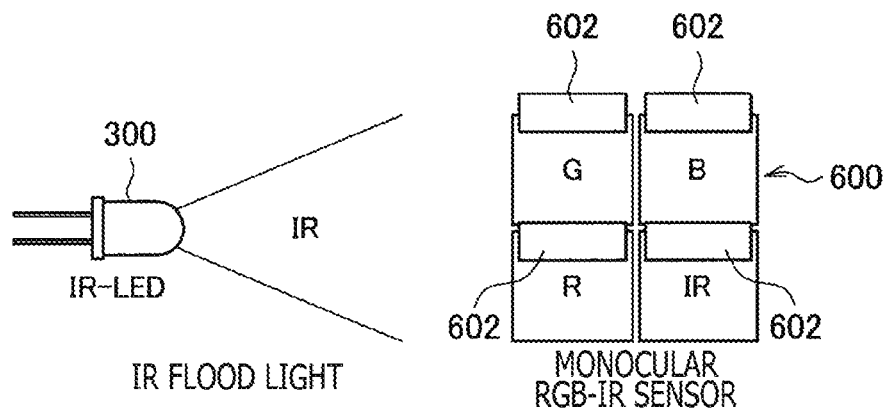
IR FLOOD LIGHT — MONOCULAR RGB-IR SENSOR
FIG.8
INPUT: ACTIVE IMAGE
(NEAR-INFRARED FLASH-
ASSISTED IMAGE)
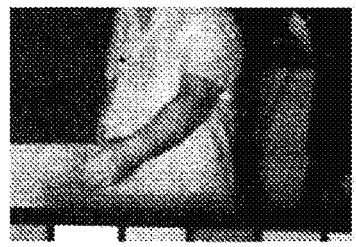
INPUT: PASSIVE IMAGE
(VISIBLE-LIGHT IMAGE)
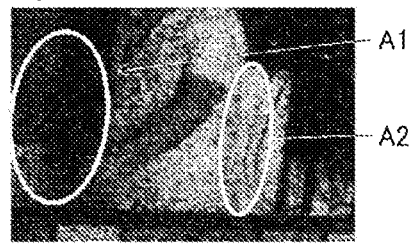
COMBINED IMAGE ACCORDING
TO CONVENTIONAL TECHNOLOGY
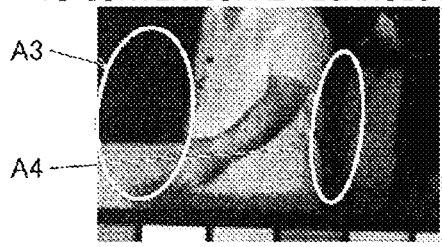
COMBINED IMAGE ACCORDING
TO PRESENT INVENTION
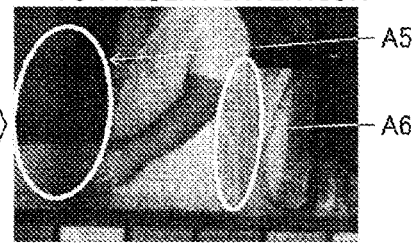

IMAGE PROCESSING APPARATUS AND IMAGING APPARATUS

CROSS REFERENCE TO RELATED APPLICATIONS

This application is a U.S. National Phase of International Patent Application No. PCT/JP2017/046969 filed on Dec. 27, 2017, which claims priority benefit of Japanese Patent Application No. JP 2017-033535 filed in the Japan Patent Office on Feb. 24, 2017. Each of the above-referenced applications is hereby incorporated herein by reference in its entirety.

TECHNICAL FIELD

The present disclosure relates to an image processing apparatus and an imaging apparatus.

BACKGROUND ART

A technology previously described, for example, in the below-mentioned PTL 1 captures an image of an object to acquire a visible light signal and an invisible light signal, combines a visible light luminance signal Y1 with an invisible light luminance signal Y2 to obtain a combined luminance signal Y3, and generates a color image by using the combined luminance signal Y3 and a corrected color signal.

CITATION LIST

Patent Literature

[PTL 1]
Japanese Patent Laid-open No. 2014-135627

SUMMARY

Technical Problems

However, the technology described in PTL 1 controls the combination ratio of the visible light luminance signal Y1 and the invisible light luminance signal Y2, the degree of amplification of the color signal, and the removal of color noise in accordance with the value of the visible light luminance signal Y1. That is, the combined luminance signal is created by adding the invisible light luminance signal and the visible light luminance signal in accordance with illuminance.

The combined luminance signal is created by adding the invisible light luminance signal and the visible light luminance signal. Therefore, there may be a case where a shadow is imaged with invisible light but not imaged with visible light. Conversely, there may be a case where a shadow imaged with visible light disappears so that the resulting image is not as natural as a visible-light image.

Further, there is a problem where image quality degradation occurs when an active image captured under light irradiation is combined with a passive image captured without light irradiation. Particularly, in a region where the shadow of an object appears on an active image, image quality degradation may occasionally occur when the images are combined.

In view of the above circumstances, it has been demanded that image quality degradation be suppressed when an active image is combined with a passive image.

Solution to Problems

According to an aspect of the present disclosure, there is provided an image processing apparatus including a combination section. Based on correlation between a luminance of an active image captured by irradiating predetermined light on an object and a luminance of a passive image captured without irradiating the predetermined light on the object, the combination section combines the luminance of the active image with the luminance of the passive image.

According to another aspect of the present disclosure, there is provided an image processing apparatus including a correction section and a combination section. Based on a luminance of a passive image captured without irradiating predetermined light on an object, the correction section corrects a luminance of an active image captured by irradiating the predetermined light on the object. The combination section combines the corrected luminance of the active image with the luminance of the passive image.

According to yet another aspect of the present disclosure, there is provided an imaging apparatus including an imaging element and an image processing apparatus. The imaging element captures an object image. The image processing apparatus includes a combination section. Based on correlation between a luminance of an active image captured by the imaging element with predetermined light irradiated on an object and a luminance of a passive image captured by the imaging element without irradiating the predetermined light on the object, the combination section combines the luminance of the active image with the luminance of the passive image.

According to still another aspect of the present disclosure, there is provided an imaging apparatus including an imaging element and an image processing apparatus. The imaging element captures an object image. The image processing apparatus includes a correction section and a combination section. Based on aluminance of a passive image captured by the imaging element without irradiating predetermined light on an object, the correction section corrects a luminance of an active image captured by the imaging element with the predetermined light irradiated on the object. The combination section combines the corrected luminance of the active image with the luminance of the passive image.

Advantageous Effect of Invention

As described above, the present disclosure makes it possible to minimize the degradation of image quality when an active image and a passive image are combined.

It should be noted that the effect described above is not necessarily restrictive. Any of the effect described in this document or other effect contemplatable from this document may be provided in addition to or in place of the above-described effect.

BRIEF DESCRIPTION OF DRAWINGS

FIG. 7 is a schematic diagram depicting exemplary configurations of an IR floodlight and a monocular RGB-IR sensor in a case where a near-infrared flash-assisted image is captured as an active image and a visible-light image is captured as a passive image.

FIG. 8 is a schematic diagram depicting effect provided by the image processing apparatus according to the embodiment.

DESCRIPTION OF EMBODIMENT

Figure 1:
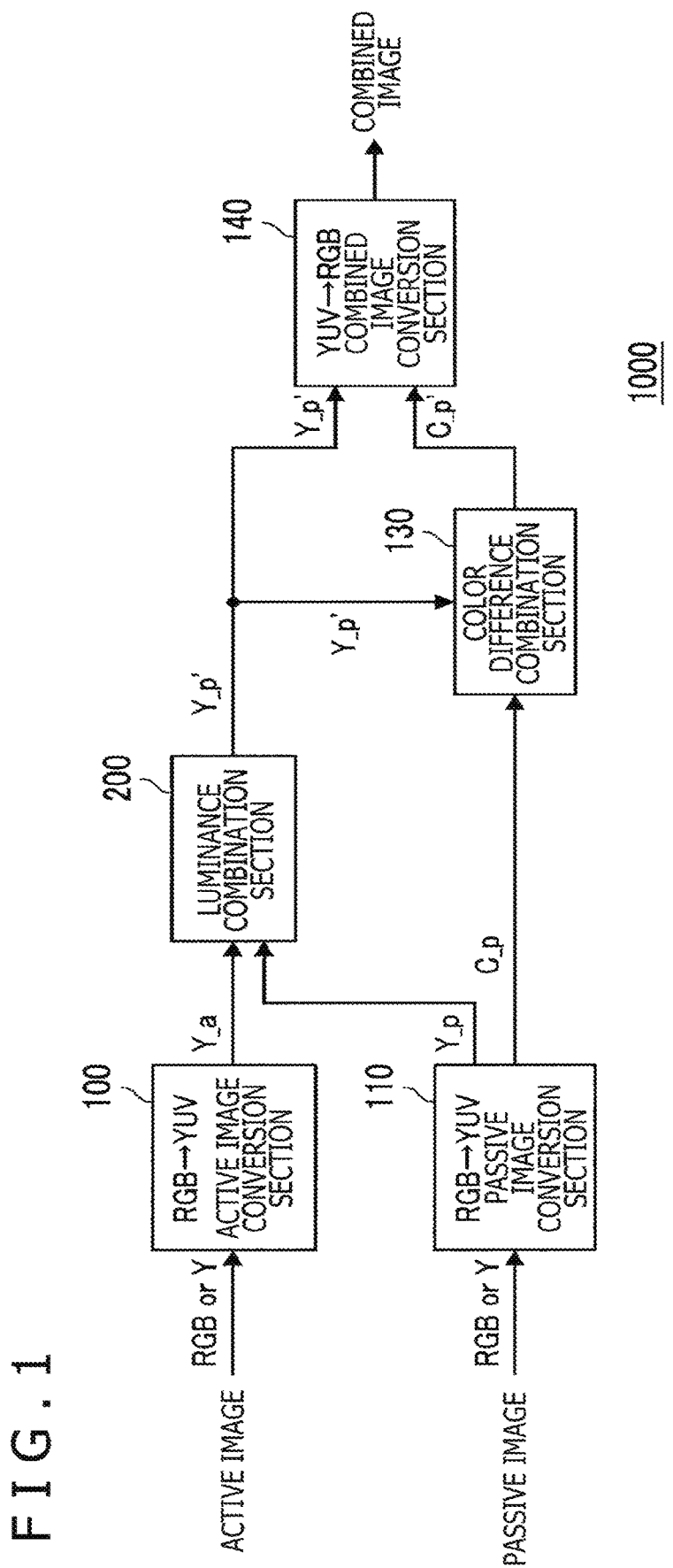
FIG. 1 is a schematic diagram depicting a configuration of an image processing apparatus according to an embodiment of the present disclosure.

A preferred embodiment of the present disclosure will now be described in detail with reference to the accompanying drawings. In this document and in the accompanying drawings, elements having substantially the same functional configuration are designated by the same reference numerals and will not be redundantly described.

The description will be given in the following order.
1. Exemplary overall configuration of image processing apparatus
2. Exemplary configuration of image combination section
3. Processing performed by image processing apparatus
4. Combination of active image and passive image
5. Effect provided by image processing apparatus according to present embodiment 1. Exemplary Schematic Configuration of Image Processing Apparatus First of all, a schematic configuration of an image processing apparatus according to an embodiment of the present disclosure will be described with reference to FIG. 1. FIG. 1 is a schematic diagram depicting a configuration of the image processing apparatus 1000 according to an embodiment of the present disclosure. As depicted in FIG. 1, the image processing apparatus 1000 includes an active image conversion section 100, a passive image conversion section 110, a luminance combination section 200, a color difference combination section 130, and a combined image conversion section 140.

An image signal representing an image captured actively by irradiating visible light, near-infrared light, or other light (hereinafter referred to as the active image) is inputted to the active image conversion section 100. Meanwhile, an image captured passively without irradiating light (hereinafter referred to as the passive image) is inputted to the passive image conversion section 110.

The active image is advantageous in that it is brighter and less noisy than the passive image. Meanwhile, the passive image is more similar to an image viewed by human eyes. Therefore, in general, the active image and the passive image are combined. When combining luminance signals of the active image and passive image, the present embodiment corrects a signal level in a local region in order to generate an image more similar to the passive image without impairing the effect of combination. Further, the present embodiment prevents the image quality degradation of a combined image by controlling a combination ratio in accordance with the amount of local region correlation between the active image and the passive image.

As an image signal representing the active image, an RGB signal (color signal) or a Y signal (luminance signal) is inputted to the active image conversion section 100. In a case where the RGB signal is inputted, the active image conversion section 100 performs a process of converting the RGB signal to a YUV signal, separates the luminance signal of the active image (Y signal ($Y\_a$)), and outputs the separated active image luminance signal to the luminance combination section 200. It should be noted that the active image conversion section 100 does not need to perform its processing in a case where no color signal is included in the active image. In this instance, the luminance signal of the active image (Y signal ($Y\_a$)) is inputted to the luminance combination section 200.

As an image signal representing the passive image, an RGB signal (color signal) or a Y signal (luminance signal) is inputted to the passive image conversion section 110. In a case where the RGB signal is inputted, the passive image conversion section 100 performs a process of converting the RGB signal to a YUV signal, separates the luminance signal of the passive image (Y signal ($Y\_p$)), and outputs the separated passive image luminance signal to the luminance combination section 200. It should be noted that the passive image conversion section 110 does not need to perform its processing in a case where no color signal is included in the passive image. In this instance, the luminance signal of the passive image (Y signal ($Y\_p$)) is inputted to the luminance combination section 200.

The luminance combination section 200 performs a process of combining the active image Y signal ($Y\_a$) and the passive image Y signal ($Y\_p$). A Y signal ($Y\_p'$) obtained from the above combination is then outputted from the luminance combination section 200.

Further, the passive image conversion section 110 outputs a signal (UV signal ($C\_p$)) remaining after the separation of the luminance signal (Y signal ($Y\_p$)) to the color difference combination section 130.

Based on the Y signal ($Y\_p'$) obtained from the above combination, the color difference combination section 130 combines color differences and outputs a color signal ($C\_p'$). For example, based on the Y signal ($Y\_p'$), the color difference combination section 130 corrects a color signal and performs a process, for example, of amplitude amplification and color noise removal. It should be noted that the color difference combination section 130 does not need to perform its processing in a case where no color signal is included in the passive image.

The Y signal ($Y\_p'$) and the color signal ($C\_p'$) are inputted to the combined image conversion section 140. The combined image conversion section 140 converts the Y signal ($Y\_p'$) and the color signal ($C\_p'$) to an RGB signal. It should be noted that the combined image conversion section 140 does not need to perform its processing in a case where the YUV signal is to be outputted as is or no color signal is included in the passive image.

2. Exemplary Configuration of Image Combination Section

Figure 2:
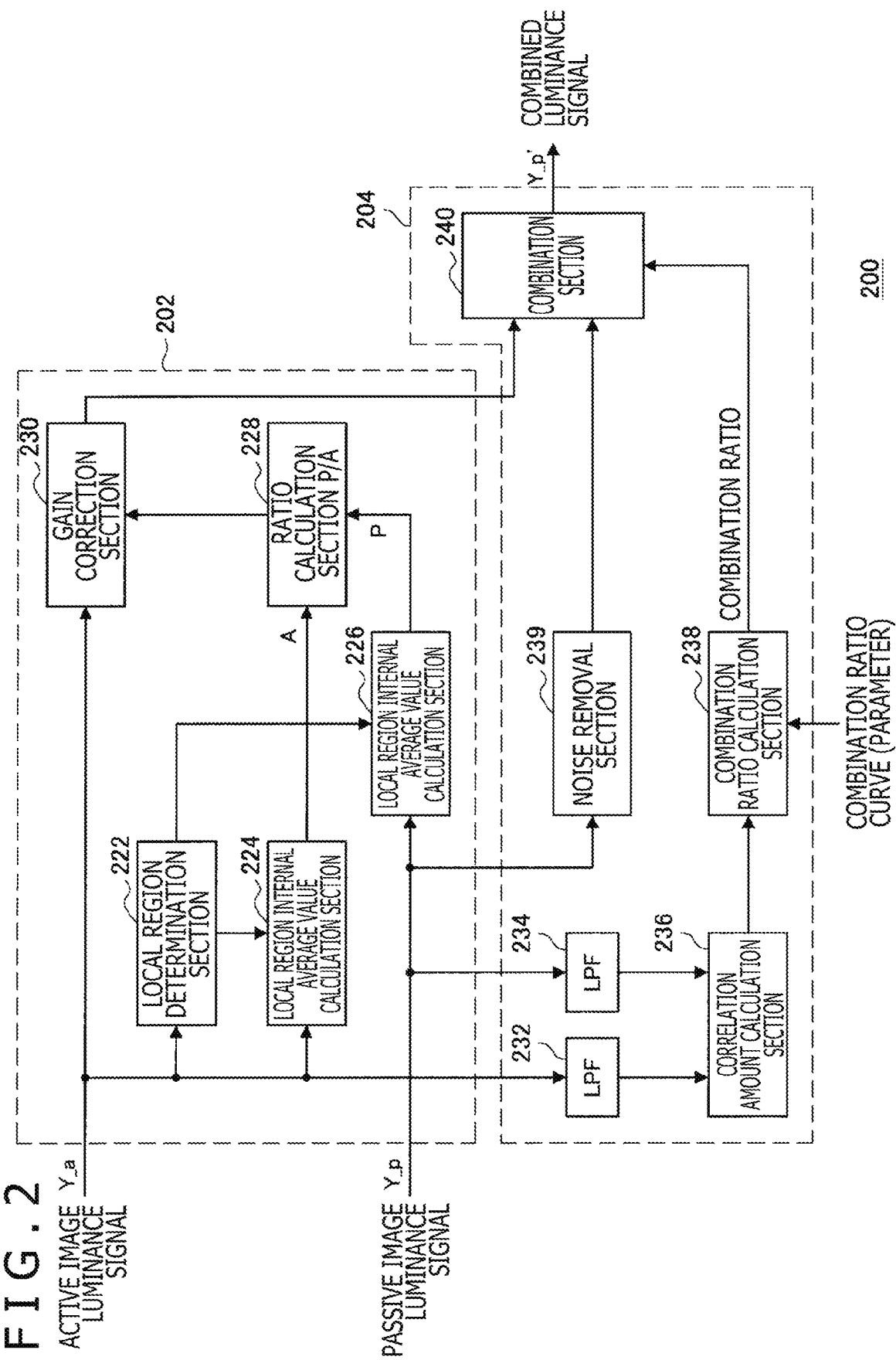
FIG. 2 is a schematic diagram depicting a configuration of a luminance combination section.

FIG. 2 is a schematic diagram depicting a configuration of the luminance combination section 200. As depicted in FIG. 2, the luminance combination section 200 includes a local region determination section 222, a local region internal average value calculation section 224 for the active image, a local region internal average value calculation section 226 for the passive image, a ratio calculation section 228, a gain correction section 230, a low-pass filter (LPF) 232, a low-pass filter (LPF) 234, a correlation amount calculation section (correlation calculation section) 236, a combination ratio calculation section 238, a noise removal section 239, and a combination section 240.

The luminance combination section 200 may be functionally divided into a signal level correction section 202 and a combination ratio control section 204. As depicted in FIG. 2, the signal level correction section 202 includes the local region determination section 222, the local region internal average value calculation section 224 for the active image, the local region internal average value calculation section 226 for the passive image, the ratio calculation section 228, and the gain correction section 230. The combination ratio control section 204 includes the low-pass filter (LPF) 232, the low-pass filter (LPF) 234, the correlation amount calculation section 236, the combination ratio calculation section 238, the noise removal section 239, and the combination section 240.

The local region determination section 222 determines the local region in accordance with an active image. The local region determination section 222 determines the local region in accordance with a filter coefficient of a bilateral filter indicated in equation (1) below. In equation (1), f(i,j) is the luminance value of an active image, i and j represent the position of a pixel, w is a filter size, $\sigma_1$ is a parameter representing a distance, and $\sigma_2$ is a parameter representing a distance difference. It should be noted that the bilateral filter indicated in equation (1) is also described in a separate document (C. Tomasi and R. Manduchi, "Bilateral Filtering for Gray and Color Images," in Proc. IEEE International Conference on Computer Vision (ICCV), 1998.).

[Math. 1]

$$\text{Bilateral}(i,\ j) = \sum_{n=-w}^{w}\sum_{m=-w}^{w} \exp\left(-\frac{m^2+n^2}{2\sigma_1^2}\right)\exp\left(-\frac{(f(i,\ j)-f(i+m,\ j+n))^2}{2\sigma_2^2}\right) \quad (1)$$

The principle of local region determination is as described below. The local region determination section 222 focuses, for example, on a 5×5 pixel region, and compares the luminance value of a pixel (target pixel) positioned at the center of the pixel region with the luminance value of another pixel in the pixel region. The weight of a pixel having a luminance value close to the luminance value of the target pixel is "1," and the weight of a pixel having a significant luminance difference from the target pixel is "0." A region obtained by joining pixels having a weight of "1" is then determined as the local region. This ensures that a region having a luminance value close to the luminance value of the target pixel is determined as the local region. Therefore, when the local region internal average value calculation sections 224 and 226, which are coupled to the output of the local region determination section 222, determine an average luminance value within the local region, they are able to determine the average luminance value in a region having similar image features. This makes it possible to calculate a proper average value. Meanwhile, if the average luminance value is determined in a region including a pixel having a significant luminance difference from the target pixel, the image features mix with each other so that a proper average value cannot be obtained in that region. In reality, however, when equation (1) above is calculated, continuous values are obtained instead of binary digits 0 and 1 so that the local region is determined based on the obtained continuous values.

The local region internal average value calculation section 224 for the active image calculates an average value A of active image luminance values by averaging the luminance values of pixels in the local region determined by the local region determination section 222. The local region internal average value calculation section 226 for the passive image calculates an average value P of passive image luminance values within the local region determined by the local region determination section 222. As described above, the average value A of the active image luminance values and the average value P of the passive image luminance values are both calculated in the same local region.

The ratio calculation section 228 calculates the ratio of the average value P to the average value A (gain=P/A). The gain correction section 230 multiplies the active image luminance signal (Y_a) by a gain (=P/A) in order to correct the active image luminance signal to a proper signal level. In this instance, the gain correction section 230 corrects the active image luminance signal (Y_a) by multiplying the luminance signals (Y_a) of all the active image pixels by the gain (=P/A).

As described above, the signal level correction section 202 performs a process of correcting the signal level of the active image to adjust the active image luminance value for the passive image luminance value by multiplying the active image luminance value by the ratio (gain) of passive image luminance to active image luminance. This converts the active image luminance to the passive image luminance. Therefore, the active image becomes more similar to the passive image. As a result, a user is able to visually recognize the active image without feeling uncomfortable.

A process performed by the combination ratio control section 204 will now be described. The low-pass filter (LPF) 232 removes high-frequency components of the active image luminance signal (Y_a). Further, the low-pass filter (LPF) 234 removes high-frequency components of the passive image Y signal (Y_p). The frequency band of the active image luminance signal (Y_a) then coincides with that of the passive image Y signal (Y_p).

The low-pass filters 232 and 234 each include, for example, a filter kernel of a 5×5 Gaussian filter as indicated below. The low-pass filters 232 and 234 are used to suppress variations caused by noise of a later-described correlation amount. However, the low-pass filters 232 and 234 may not be used depending on signal conditions. For example, in a case where the active image luminance signal (Y_a) and the passive image luminance signal (Y_p) are not noisy, the low-pass filters 132 and 134 does not need to perform their processing. Further, in a case where, for example, the frequency band of the active image luminance signal (Y_a) is already in coincidence with that of the passive image luminance signal (Y_p), the low-pass filters 132 and 134 does not need to perform their processing either.

$$\text{kernel} = \begin{bmatrix} \frac{1}{256} & \frac{4}{256} & \frac{6}{256} & \frac{4}{256} & \frac{1}{256} \\ \frac{4}{256} & \frac{16}{256} & \frac{24}{256} & \frac{16}{256} & \frac{4}{256} \\ \frac{6}{256} & \frac{24}{256} & \frac{36}{256} & \frac{24}{256} & \frac{6}{256} \\ \frac{4}{256} & \frac{16}{256} & \frac{24}{256} & \frac{16}{256} & \frac{4}{256} \\ \frac{1}{256} & \frac{4}{256} & \frac{6}{256} & \frac{4}{256} & \frac{1}{256} \end{bmatrix} \quad \text{[Math. 2]}$$

The correlation amount calculation section 236 calculates the amount of correlation between the active image and the passive image from the active image luminance signal (Y_a) and passive image luminance signal (Y_p) from which the high-frequency components are removed. The correlation amount can be accurately calculated because the frequency band of the active image luminance signal (Y_a) is made coincident with that of the passive image luminance signal (Y_p) by the low-pass filters 132 and 134.

As an exemplary method of correlation amount calculation, the zero-mean normalized cross-correlation (ZNCC) method may be used. The correlation amount ZNCC may be expressed by equation (2) below by using an active image luminance value A, a passive image luminance value P, an active image local region luminance average value A', and a passive image local region luminance average value P'. The correlation amount is calculated on an individual pixel basis. However, in order to provide increased robustness, the correlation amount is calculated in consideration of a local region around a pixel subjected to correlation amount calculation (e.g., 7×7 square region). It should be noted that the local region used here is different from a local region determined by the local region determination section 222 and set around each pixel subjected to correlation amount calculation.

$$ZNCC = (\Sigma(A-A')(P-P'))/\sqrt{(\Sigma\Sigma(A-A')^2(P-P')^2)} \quad (2)$$

The noise removal section 239 removes noise from the passive image Y signal (Y_p). The passive image is generally dark and noisy. Therefore, the noise removal section 239 removes noise from the passive image. The combination section 240 combines the active image luminance signal (Y_a) corrected by the gain correction section 230 with the passive image Y signal (Y_p) from which noise is removed by the noise removal section 239, and calculates a combined luminance signal (Y_p').

Figure 3:
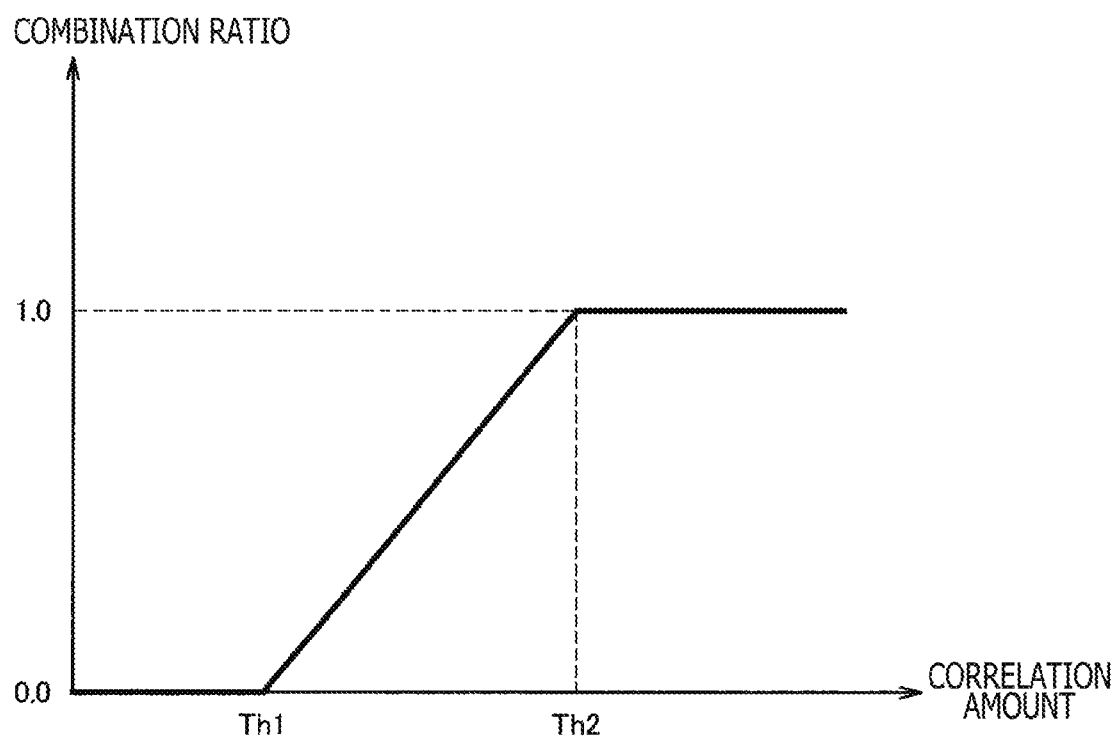
FIG. 3 is a characteristic diagram depicting a combination ratio line that is used when a combination ratio calculation section calculates a combination ratio.

Based on the correlation amount calculated by the correlation amount calculation section 236, the combination ratio calculation section 238 calculates the combination ratio for the combination to be performed by the combination section 240. FIG. 3 is a characteristic diagram depicting a combination ratio line that is used when the combination ratio calculation section 238 calculates the combination ratio. In FIG. 3, the horizontal axis represents the correlation amount, and the vertical axis represents the combination ratio. As indicated in FIG. 3, the combination ratio increases with an increase in the correlation amount. As described above, based on the combination ratio line, which is preset, the combination ratio calculation section 238 calculates the combination ratio in accordance with the amount of correlation between the active image and the passive image.

FIG. 3 depicts a case where the relationship between the correlation amount and the combination ratio is linear. However, the combination ratio line may be a curve. Thus, the combination ratio may exponentially increase with an increase in the correlation amount. Further, the combination ratio may increase stepwise (in a staircase pattern) with an increase in the correlation amount.

The combination ratio denotes the ratio of combination in the combination section 240, that is, the ratio between the active image subjected to gain correction and the passive image subjected to noise removal. As the combination ratio increases, the ratio of the gain-corrected active image increases, and the ratio of the passive image decreases. Further, as the combination ratio decreases, the ratio of the passive image increases, and the ratio of the gain-corrected image decreases.

As the correlation amount is calculated on an individual pixel basis, the combination ratio is also calculated on an individual pixel basis. Based on the combination ratio calculated on an individual pixel basis, the combination section 240 combines, on an individual pixel basis, the luminance of the gain-corrected active image with the luminance of the noise-removed passive image.

As described above, the combination ratio control section 204 calculates the combination ratio in accordance with the amount of correlation between the active image and the passive image. In such an instance, the larger the correlation amount, the smaller the degree of degradation of the active image. Therefore, the combination section 240 performs combination in such a manner as to increase the ratio of the gain-corrected active image. Further, the smaller the correlation amount, the greater the degree of degradation of the active image. Therefore, the combination section 240 performs combination in such a manner as to decrease the ratio of the gain-corrected active image.

The active image subjected to gain correction by the gain correction section 230 has a luminance substantially equal to that of the passive image, and is visually recognizable as a passive image. Meanwhile, the image quality of the gain-corrected active image may be degraded. In a case where the amount of correlation between the active image and the passive image is small, the present embodiment determines that the gain-corrected active image is degraded, and performs combination with the ratio of the passive image increased. This makes it possible to surely suppress the image quality degradation of the active image.

Figure 4:
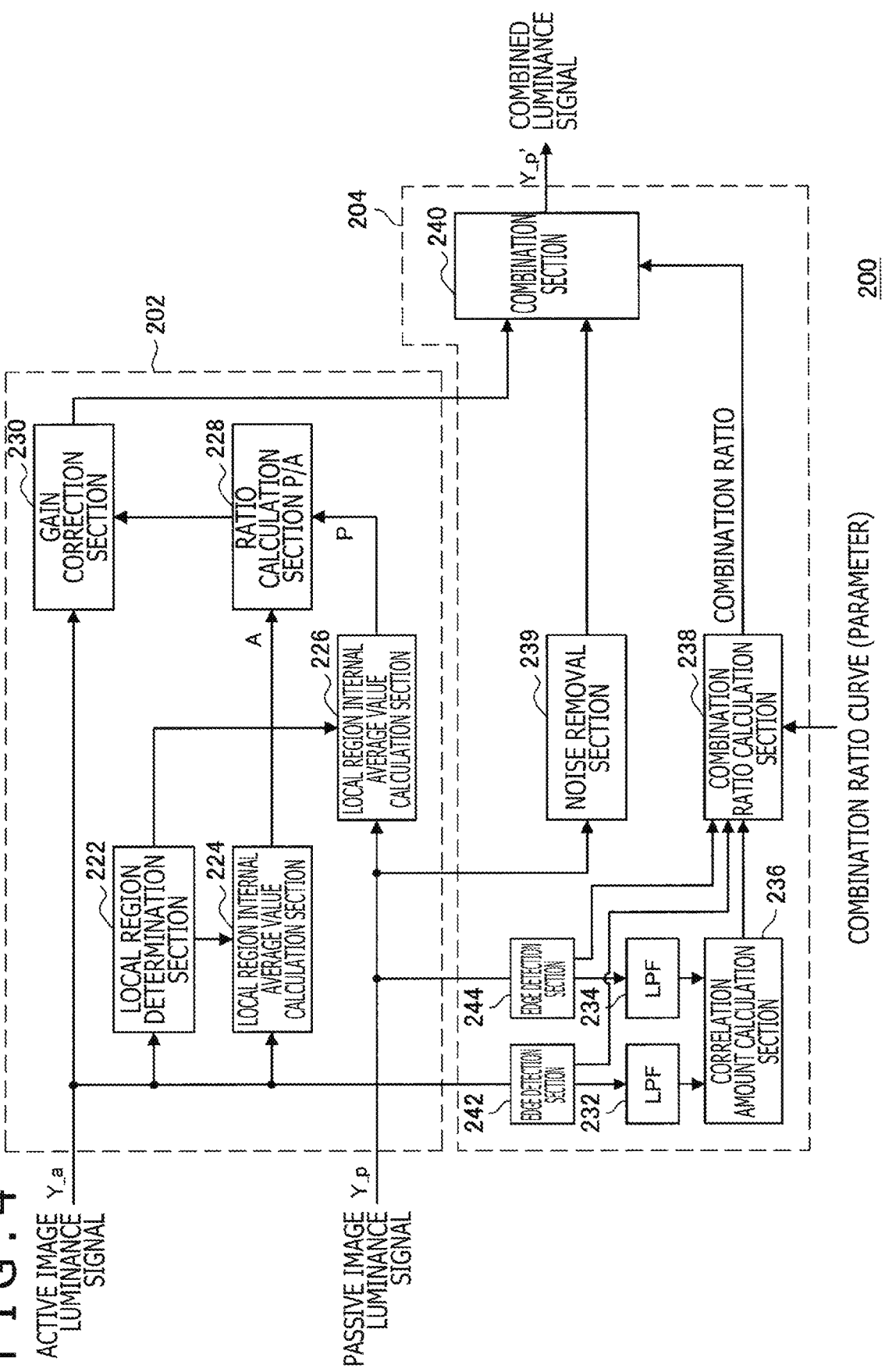
FIG. 4 is a schematic diagram depicting a configuration in a case where a combination ratio control section performs processing on only an image edge region.

Image quality degradation is likely to occur in an edge portion of an image. Therefore, the combination ratio control section 204 may process only the edge region of an image. FIG. 4 is a schematic diagram depicting a configuration in a case where the combination ratio control section 204 processes only the edge region of an image. As depicted in FIG. 4, edge detection sections 242, 244 are added to the configuration depicted in FIG. 2.

The edge detection section 242 determines the edge region in accordance with the active image luminance signal (Y_a). Further, the edge detection section 244 detects the edge region in accordance with the passive image luminance signal (Y_a). When the edge of a pixel within a target region is detected by both the edge detection section 242 and the edge detection section 244, information to that effect is transmitted to the combination ratio calculation section 238. As regards the pixel whose edge is detected by both the edge detection section 242 and the edge detection section 244, the combination ratio calculation section 238 calculates the combination ratio in accordance with the correlation amount and transmits the calculated combination ratio to the combination section 240. Accordingly, the combination section 240 performs a combination process only on the pixel whose edge is detected by both the edge detection section 242 and the edge detection section 244. Meanwhile, as regards a pixel whose edge is detected by either one or none of the edge detection section 242 and the edge detection section 244, it is determined that image quality is not significantly degraded. In this instance, the output from the gain correction section 230 may be used as the output of the combination section 240 without allowing the combination section 240 to perform combination.

3. Processing Performed by Image Processing Apparatus

Figure 5:
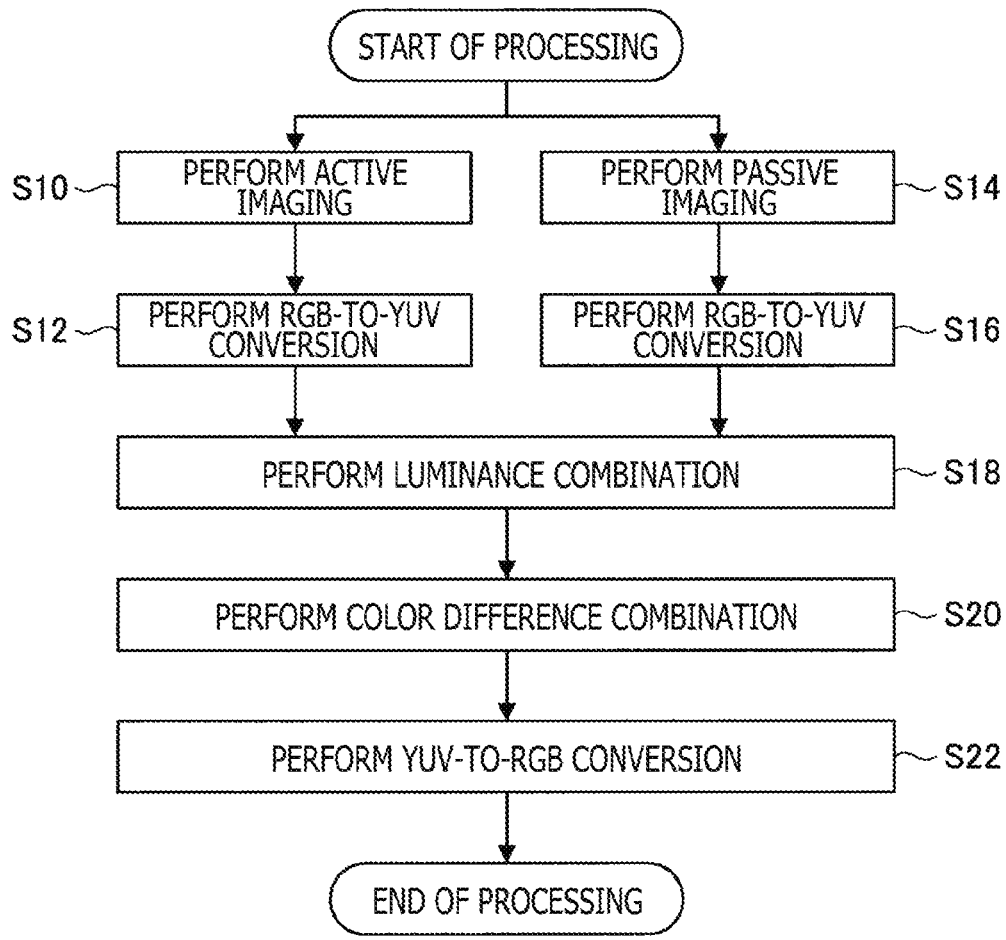
FIG. 5 is a schematic diagram depicting processing performed by the image processing apparatus according to the embodiment.

FIG. 5 is a schematic diagram depicting processing performed by the image processing apparatus 1000 according to the present embodiment. When the processing starts, steps S10 and S12 and steps S14 and S16 are performed in parallel. In step S10, active imaging is performed to acquire an image signal representing the active image. Next, in step S12, the active image conversion section 100 performs a process of converting the RGB signal of the active image to the YUV signal.

Further, in step S14, passing imaging is performed to acquire an image signal representing the passive image. Next, in step S16, the passive image conversion section 110 performs a process of converting the RGB signal of the passive image to the YUV signal.

Upon completion of steps S12 and S16, the processing proceeds to step S18. In step S18, the luminance combination section 200 performs luminance combination. In step S20, the color difference combination section 130 performs color difference combination.

Next, in step S22, the combined image conversion section 140 performs a process of converting the luminance signal (Y_p') and the color signal (C_p') to an RGB signal. Upon completion of step S22, the processing terminates.

4. Combination of Active Image and Passive Image

A combination of the active image and the passive image will now be described. A near-infrared flash-assisted image captured with near-infrared light irradiated and a visible-light flash-assisted image captured with visible light irradiated are cited as examples of the active image. A visible-light image and a far-infrared image are cited as examples of the passive image. In this case, the following three different combinations of the active image and the passive image may be used.

Figure 6:
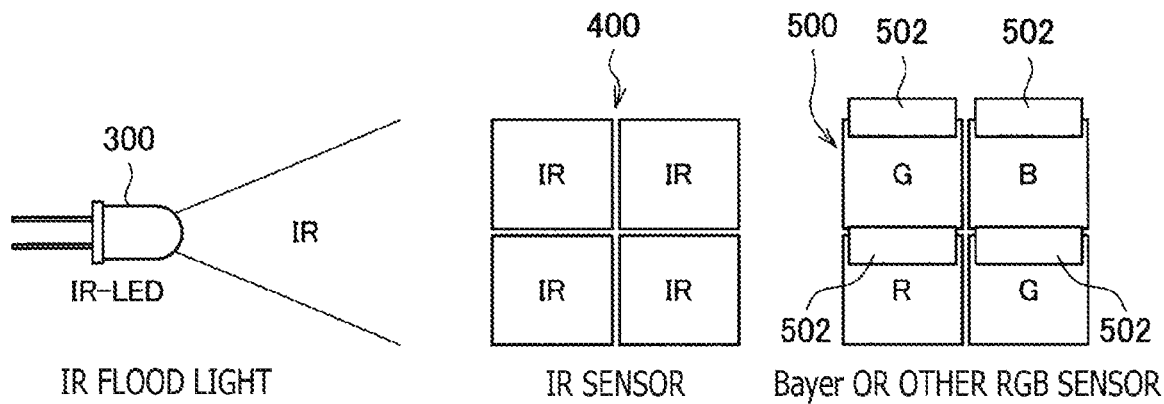
FIG. 6 is a schematic diagram depicting exemplary configurations of an IR floodlight, an IR sensor, and an RGB sensor in a case where a near-infrared flash-assisted image is captured as an active image and a visible-light image is captured as a passive image.

(1) Using a near-infrared flash-assisted image as the active image and using a visible-light image as the passive image
(2) Using a near-infrared flash-assisted image as the active image and using a far-infrared image as the passive image
(3) Using a visible-light flash-assisted image as the active image and using a visible-light image as the passive image FIG. 6 is a schematic diagram depicting exemplary configurations of an IR floodlight 300, an IR sensor 400, and an RGB sensor 500 in a case where a near-infrared flash-assisted image is captured as the active image and a visible-light image is captured as the passive image. In the example of FIG. 5, the IR sensor 400 and the RGB sensor 500 are configured as separate sensors. When the active image is to be captured, the IR floodlight 300 emits infrared light to an object. Therefore, the RGB sensor 500 includes an IR cut filter 502 that cuts infrared light.

The active image (IR image) is acquired by demosaicing a signal of the IR sensor 400. Further, the passive image (visible-light image) is acquired by demosaicing a signal of the RGB sensor 500. The IR sensor 400 and the RGB sensor 500 are separately configured. Therefore, after the active image and the passive image are acquired, the active image and the passive image are aligned to associate the active image and the passive image.

FIG. 7 is a schematic diagram depicting exemplary configurations of the IR floodlight 300 and a monocular RGB-IR sensor 600 in a case where a near-infrared flash-assisted image is captured as the active image and a visible-light image is captured as the passive image. In the example of FIG. 7, the IR sensor 400 and the RGB sensor 500 depicted in FIG. 6 are integrated with each other and configured as the monocular RGB-IR sensor 600. Therefore, the monocular RGB-IR sensor 600 includes an R pixel for detecting red color, a G pixel for detecting green color, a B pixel for detecting blue color, and an IR pixel for detecting infrared light. It should be noted that the IR sensor 400 and RGB sensor 500 depicted in FIG. 6 and the monocular RGB-IR sensor 600 depicted in FIG. 7 are examples of an imaging apparatus.

When the active image is to be captured, the IR floodlight 300 emits infrared light to the object. The R, G, and B pixels of the monocular RGB-IR sensor 600 each include an IR cut filter 602 that cuts infrared light. Therefore, the R, G, and B pixels detect visible light without detecting infrared light. Meanwhile, the IR pixel detects infrared light.

The active image (IR image) is acquired by demosaicing a signal of the IR pixel. Further, the passive image (visible-light image) is acquired by demosaicing the R, G, and B pixels, namely, visible-light pixels. It should be noted that a signal corresponding to infrared light at the positions of the visible-light pixels (R, G, and B pixels) can be obtained by interpolating the signal of the IR pixel. Similarly, a signal corresponding to visible light at the position of the IR pixel can be obtained by interpolating the visible-light pixels, namely, the R, G, and B pixels. In the exemplary configurations depicted in FIG. 7, the alignment in the configuration depicted in FIG. 6 is not required because the IR pixel and the visible-light pixels are included in a single sensor.

5. Effect Provided by Image Processing Apparatus According to Present Embodiment FIG. 8 is a schematic diagram depicting effect provided by the image processing apparatus 1000 according to the present embodiment. FIG. 8 particularly depicts effect provided by the signal level correction section 202. When combining the active image and the passive image, the present embodiment generates an image more similar to the passive image (an image more similar to an image viewed by human eyes) without allowing an unviewable shadow in the passive image to appear or disappear. The upper part of FIG. 8 depicts the active image (near-infrared flash-assisted image) and the passive image (visible-light image) that are to be inputted to the image processing apparatus 1000. The lower part of FIG. 8 depicts combined images that are obtained by combining the active image and passive image depicted in the upper part. The lower left part of FIG. 8 depicts a combined image (comparative example) obtained by a conventional technology, and the lower right part of FIG. 8 depicts a combined image obtained by the image processing apparatus 1000 according to the present embodiment.

In the passive image depicted in the upper part of FIG. 8, there is a shadow to the left of a person (region A1), but no shadow to the right of the person (region A2). Meanwhile, in the active image in the upper part of FIG. 7, there is no shadow to the left of the person, but there is a shadow to the right of the person. In this instance, the passive image is more similar to an image viewed by human eyes.

In the combined image in the comparative example, there is no shadow to the left of the person (region A3), but there is a shadow to the right of the person (region A4), as is the case with the active image. Therefore, unlike the passive image, the combined image in the comparative example is different from the image viewed by human eyes. Meanwhile, in the combined image obtained in the present embodiment, the level of the luminance signal is corrected by the signal level correction section 202 so that, as is the case with the passive image, there is a shadow to the left of the person (region A5), but no shadow to the right of the person (region A6). Consequently, the present embodiment makes it possible to obtain a combined image that is more similar to the image viewed by human eyes.

Figure 9:
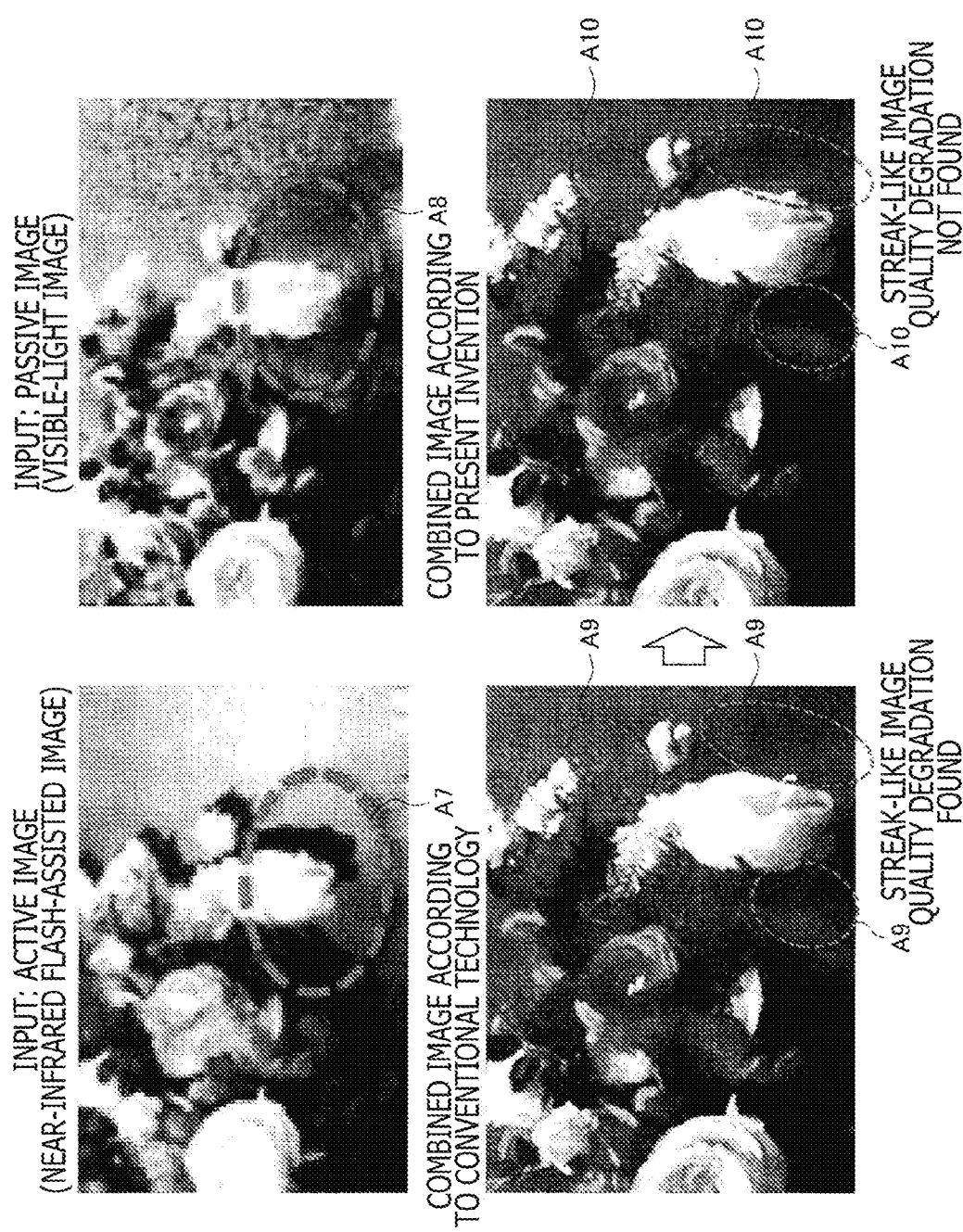
FIG. 9 is a schematic diagram depicting effect provided by the image processing apparatus according to the embodiment.

FIG. 9 is a schematic diagram depicting effect provided by the image processing apparatus 1000 according to the present embodiment. FIG. 9 particularly depicts effect provided by the combination ratio control section 204. The upper part of FIG. 9 depicts the active image (near-infrared flash-assisted image) and the passive image (visible-light image) that are to be inputted to the image processing apparatus 1000. The lower part of FIG. 9 depicts combined images that are obtained by combining the active image and passive image depicted in the upper part. The lower left part of FIG. 9 depicts a combined image (comparative example) obtained by a conventional technology, and the lower right part of FIG. 9 depicts a combined image obtained by the image processing apparatus 1000 according to the present embodiment.

In the active image depicted in FIG. 9, a black shadow is viewable behind a flower in the lower right area (region A7). Meanwhile, in the passive image depicted in FIG. 9, there is substantially no shadow behind the flower in the lower right area (region A8). In this instance, the passive image is more similar to an image viewed by human eyes.

In a combined image in the comparative example and in a combined image obtained in the present embodiment depicted in the lower part of FIG. 9, there is substantially no shadow behind the flower in the lower right area. Therefore, these combined images are similar to the image viewed by human eyes, as is the case with the passive image. However, in the combined image in the comparative example, streak-like image quality degradation is found in a place where the black shadow is viewable in the active image (region A9).

Meanwhile, in the present embodiment, due to the earlier-described process performed by the combination ratio control section 204, the combination ratio of a noise-removed passive image is high in a region where the amount of correlation between the active image and the passive image is small. In a region where the black shadow is viewable in the active image, there is substantially no shadow in the case of the passive image. Thus, the amount of correlation between the active image and the passive image is small in the region where the black shadow is viewable in the active image. Therefore, the combination ratio of the passive image is high in the combination process performed by the combination section 240. As a result, streak-like image quality degradation is not found in the combined image obtained in the present embodiment, which is depicted in FIG. 9 (region A10). Consequently, the present embodiment makes it possible to minimize image quality degradation that occurs when the active image and the passive image are combined.

As described above, when combining the luminance signal of the active image with the luminance signal of the passive image, the present embodiment corrects the signal level in the local region. This makes it possible to obtain a combined image similar to the passive image (similar to an image viewed by human eyes). Further, the present embodiment controls the combination ratio in accordance with the amount of local region correlation between the active image and the passive image. This makes it possible to particularly prevent the image quality degradation of the combined image in the vicinity of a shadow boundary of the active image.

A preferred embodiment of the present disclosure has been described in detail with reference to the accompanying drawings. However, the technical scope of the present disclosure is not limited to the foregoing examples. A person skilled in the art can conceive various alterations and modifications within the scope of the technical ideas described in the appended claims. It is to be understood that such alterations and modifications are also encompassed within the technical scope of the present disclosure.

Further, the effect described in this document are explanatory or illustrative, and not restrictive. That is, in addition to or in place of the above-described effect, the technology according to the present disclosure is able to provide other effect that can be easily contemplated from this document by a person skilled in the art.

It should be noted that the following configurations are also within the technical scope of the pressure disclosure.

(1)

An image processing apparatus including:

a combination section that, based on the correlation between the a luminance of an active image captured by irradiating predetermined light on an object and a luminance of a passive image captured without irradiating the predetermined light on the object, combines the luminance of the active image with the luminance of the passive image.

(2)

The image processing apparatus as described in (1) above, in which the combination section combine the luminance of the active image with the luminance of the passive image in such a manner that the ratio of the active image is higher when the correlation between the luminance of the active image and the luminance of the passive image is high than when the correlation is low.

(3)

The image processing apparatus as described in (1) or (2) above, further including:

a correlation calculation section that calculates the correlation.

(4)

The image processing apparatus as described in (3) above, further including:

a combination ratio calculation section that calculates a combination ratio at which the combination section combines the luminance of the active image with the luminance of the passive image, in which the correlation calculation section calculates the correlation on an individual pixel basis, and the combination ratio calculation section calculates the combination ratio on an individual pixel basis.

(5)

The image processing apparatus as described in any one of (1) to (4) above, further including:

an edge detection section that detects an edge in the active image or in the passive image, in which in a region where the edge is detected, the combination section combines the luminance of the active image with the luminance of the passive image.

(6)

The image processing apparatus as described in any one of (1) to (5), further including:

a correction section corrects the luminance of the active image by using the ratio of the luminance of the passive image to the luminance of the active image in a local region.

(7)
The image processing apparatus as described in (6) above, further including:
    a local region determination section locates a pixel region where the luminance difference of the active image is small, and determines the located pixel region as the local region.
(8)
The image processing apparatus as described in any one of (1) to (7) above, in which
    the active image includes an image captured by irradiating infrared light, and
    the passive image includes a visible-light image.
(9)
An image processing apparatus including:
    a correction section that, based on a luminance of a passive image captured without irradiating predetermined light on an object, corrects a luminance of an active image captured by irradiating the predetermined light on the object; and
    a combination section that combines the corrected luminance of the active image with the luminance of the passive image.
(10)
The image processing apparatus as described in (9) above, in which
    the correction section corrects the luminance of the active image by using the ratio of the luminance of the passive image to the luminance of the active image in a local region.
(11)
The image processing apparatus as described in (10) above, further including:
    a local region determination section that locates a pixel region where the luminance difference of the active image is small, and determines the located pixel region as the local region.
(12)
An imaging apparatus including:
    an imaging element that captures an object image; and
    an image processing apparatus that includes a combination section, in which
    based on correlation between a luminance of an active image captured by the imaging element with predetermined light irradiated on an object and a luminance of a passive image captured by the imaging element without irradiating the predetermined light on the object, the combination section combines the luminance of the active image with the luminance of the passive image.
(13)
An imaging apparatus including:
    an imaging element that captures an object image; and
    an image processing apparatus that includes a correction section and a combination section, in which
    based on a luminance of a passive image captured by the imaging element without irradiating predetermined light on an object, the correction section corrects a luminance of an active image captured by the imaging element with the predetermined light irradiated on the object, and
    the combination section combines the corrected luminance of the active image with the luminance of the passive image.

REFERENCE SIGNS LIST

222 Local region determination section
230 Gain correction section
236 Correlation amount calculation section
238 Combination ratio calculation section
240 Combination section
242, 244 Edge detection section
400 IR sensor
500 RGB sensor
600 Monocular RGB-IR sensor

The invention claimed is:
1. An image processing apparatus, comprising:
    a combination section that, based on correlation between a luminance of an active image captured by irradiating predetermined light on an object and a luminance of a passive image captured without irradiating the predetermined light on the object, combines the luminance of the active image with the luminance of the passive image,
    wherein the combination section combines the luminance of the active image with the luminance of the passive image in such a manner that a ratio of the active image is higher when the correlation between the luminance of the active image and the luminance of the passive image is high than when the correlation is low.
2. The image processing apparatus according to claim 1, further comprising:
    a correlation calculation section that calculates the correlation.
3. The image processing apparatus according to claim 2, further comprising:
    a combination ratio calculation section that calculates a combination ratio at which the combination section combines the luminance of the active image with the luminance of the passive image, wherein
    the correlation calculation section calculates the correlation on an individual pixel basis, and
    the combination ratio calculation section calculates the combination ratio on an individual pixel basis.
4. The image processing apparatus according to claim 1, further comprising:
    an edge detection section that detects an edge in the active image or in the passive image, wherein
    in a region where the edge is detected, the combination section combines the luminance of the active image with the luminance of the passive image.
5. The image processing apparatus according to claim 1, further comprising:
    a correction section that corrects the luminance of the active image by using a ratio of the luminance of the passive image to the luminance of the active image in a local region.
6. The image processing apparatus according to claim 5, further comprising:
    a local region determination section that locates a pixel region where a luminance difference of the active image is small, and determines the located pixel region as the local region.
7. The image processing apparatus according to claim 1, wherein
    the active image includes an image captured by irradiating infrared light, and
    the passive image includes a visible-light image.
8. An image processing apparatus, comprising:
    a correction section that, based on a luminance of a passive image captured without irradiating predetermined light on an object, corrects a luminance of an active image captured by irradiating the predetermined light on the object; and
    a combination section that combines the corrected luminance of the active image with the luminance of the passive image.

9. The image processing apparatus according to claim 8, wherein the correction section corrects the luminance of the active image by using a ratio of the luminance of the passive image to the luminance of the active image in a local region.

10. The image processing apparatus according to claim 9, further comprising:

a local region determination section that locates a pixel region where a luminance difference of the active image is small, and determines the located pixel region as the local region.

11. An imaging apparatus, comprising:

an imaging element that captures an object image; and an image processing apparatus that includes a combination section, wherein based on correlation between a luminance of an active image captured by the imaging element with predetermined light irradiated on an object and a luminance of a passive image captured by the imaging element without irradiating the predetermined light on the object, the combination section combines the luminance of the active image with the luminance of the passive image, and the combination section combines the luminance of the active image with the luminance of the passive image in such a manner that a ratio of the active image is higher when the correlation between the luminance of the active image and the luminance of the passive image is high than when the correlation is low.

12. An imaging apparatus, comprising:

an imaging element that captures an object image; and an image processing apparatus that includes a correction section and a combination section, wherein based on a luminance of a passive image captured by the imaging element without irradiating predetermined light on an object, the correction section corrects a luminance of an active image captured by the imaging element with the predetermined light irradiated on the object, the combination section combines the corrected luminance of the active image with the luminance of the passive image, and the combination section combines the luminance of the active image with the luminance of the passive image in such a manner that a ratio of the active image is higher when a correlation between the luminance of the active image and the luminance of the passive image is high than when the correlation is low.

\* \* \* \* \*